United States Patent
Szita et al.

(10) Patent No.: US 9,514,774 B1
(45) Date of Patent: Dec. 6, 2016

(54) SPIRAL PITCH CORRECTION BASED ON MICRO-JOG VARIATION

(71) Applicant: KABUSHIKI KAISHA TOSHIBA, Tokyo (JP)

(72) Inventors: Gabor Szita, Mountain View, CA (US); Jiangang Liang, San Jose, CA (US); Anton Gerasimov, Santa Clara, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/924,630

(22) Filed: Oct. 27, 2015

(51) Int. Cl.
| | |
|---|---|
| *G11B 21/02* | (2006.01) |
| *G11B 5/596* | (2006.01) |
| *G11B 5/012* | (2006.01) |
| *G11B 20/12* | (2006.01) |

(52) U.S. Cl.
CPC .......... *G11B 5/59666* (2013.01); *G11B 5/012* (2013.01); *G11B 5/59688* (2013.01); *G11B 2020/1232* (2013.01)

(58) Field of Classification Search
None
See application file for complete search history.

(56) References Cited

U.S. PATENT DOCUMENTS

| | | | |
|---|---|---|---|
| 6,369,974 B1 * | 4/2002 | Asgari | G11B 5/59655 360/75 |
| 6,519,107 B1 | 2/2003 | Ehrlich et al. | |
| 7,006,322 B2 * | 2/2006 | Sado | G11B 5/59633 360/75 |
| 7,573,669 B2 | 8/2009 | Saikawa et al. | |
| 7,586,709 B2 | 9/2009 | Fukushima et al. | |
| 7,881,004 B2 | 2/2011 | Kumbla et al. | |
| 2007/0247742 A1 | 10/2007 | Saikawa et al. | |

* cited by examiner

*Primary Examiner* — K. Wong
(74) *Attorney, Agent, or Firm* — Patterson & Sheridan, LLP

(57) ABSTRACT

During a self-servo write process, servo sectors that have uniform radial spacing are written on a disk surface. As part of the in-drive writing of the servo sectors, a radial offset between a reader element and a writer element of a magnetic head is measured. The measured radial offset, or micro-jog, is compared to a known nominal micro-jog value for the current radial position of the magnetic head. When the measured micro-jog value does not match the nominal micro-jog value, an appropriate correction to the self-servo write step size is applied to the radial spacing between the servo sectors being written. Variations from ideal servo spiral slope that are inherent in some servo spirals can be compensated for, thereby improving the uniformity of radial spacing of data tracks associated with the servo sectors.

20 Claims, 11 Drawing Sheets

SPIRAL PITCH CORRECTION BASED ON MICRO-JOG VARIATION

BACKGROUND

In a typical hard disk drive (HDD), servo sectors on the disk are used to provide position information about the location of a magnetic head over a disk surface. A one approach for writing such servo information on a disk surface of an HDD is referred to as spiral-based self-servo writing, or spiral-based SSW. According to this approach, multiple spiral-shaped servo information patterns (or "servo spirals") are written on at least one disk surface prior to the SSW process. During the SSW process, each magnetic head of the HDD is positioned relative to a disk surface based on the servo spirals, so that the final servo information (the servo sectors) can be written on the disk surface by the magnetic head.

Ideally, the servo sectors written on a disk surface during an SSW process are equally spaced on the disk surface in the radial direction, so that data track pitch, i.e., the radial spacing between each data track, is substantially the same across the entire disk surface. This is because variable data track pitch on different regions of a disk surface can cause data integrity problems and/or reduce HDD performance. Unfortunately, data track pitch is strongly affected by the slope of the servo spirals used to position the magnetic head while writing the data track servo sectors, and the servo spirals typically employed in the SSW process commonly include portions that vary significantly from the ideal servo spiral shape. Consequently, data track servo sectors can be written on a disk surface with unwanted variation in data track pitch. Accordingly, there is a need in the art for systems and methods of generating servo sectors on a disk surface of an HDD with more uniform data track pitch.

SUMMARY

One or more embodiments provide systems and methods for in-drive writing of servo sectors that have uniform radial spacing on a disk surface. During a self-servo write process, as servo sectors are written across the disk surface, micro jog is measured, which is the radial offset between a reader element and a writer element of a magnetic head. The measured micro jog value is compared to a known nominal micro jog value for the current radial position of the magnetic head, and when the measured micro-jog value does not match the nominal micro-jog value, an appropriate correction to the self-servo write step size is applied to the radial spacing between the servo sectors being written. Thus, the variations from ideal servo spiral slope that are inherent in some servo spirals can be compensated for, thereby improving the uniformity of radial spacing of the data tracks associated with the servo sectors.

A method of writing servo information, according to an embodiment, is carried out on a surface of a magnetic disk with a magnetic head having a read head and a write head that is offset from the read head by a fixed distance. The method includes writing servo sectors defining a first set of data tracks on the surface of the magnetic disk using the write head, wherein the write head is positioned during the writing of the first set of data tracks according to positioning signals generated by the read head, measuring a radial offset between the write head and the read head when the read head and the write head are positioned over the first set of data tracks, determining a track pitch adjustment based on a difference between the measured radial offset and an expected radial offset when the read head and the write head are positioned over the first set of data tracks, and writing servo sectors defining a second set of data tracks on the surface of the magnetic disk using the write head, wherein the write head is positioned during the writing of the second set of data tracks according to positioning signals generated by the read head and the track pitch adjustment.

A data storage device, according to embodiments, includes a magnetic disk with a writable surface, a magnetic head having a read head and a write head that is offset from the read head by a fixed distance, and a controller. In one embodiment, the controller is configured to cause servo sectors defining a first set of data tracks to be written on the surface of the magnetic disk using a write head, wherein the write head is positioned during the writing of the first set of data tracks according to positioning signals generated by the read head, cause a radial offset to be measured between the write head and the read head when the read head and the write head are positioned over the first set of data tracks, determine a track pitch adjustment based on a difference between the measured radial offset and an expected radial offset when the read head and the write head are positioned over the first set of data tracks, and cause servo sectors defining a second set of data tracks to be written on the surface of the magnetic disk using the write head, wherein the write head is positioned during the writing of the second set of data tracks according to positioning signals generated by the read head and the track pitch adjustment.

A method of manufacturing a hard disk drive with a magnetic head having a read head and a write head that is offset from the read head by a fixed distance, according to an embodiment, includes incorporating a magnetic disk in a housing of the hard disk drive and writing servo sectors defining a first set of data tracks on the surface of the magnetic disk using the write head, wherein the write head is positioned during the writing of the first set of data tracks according to positioning signals generated by the read head. The method further includes measuring a radial offset between the write head and the read head when the read head and the write head are positioned over the first set of data tracks, determining a track pitch adjustment based on a difference between the measured radial offset and an expected radial offset when the read head and the write head are positioned over the first set of data tracks, and writing servo sectors defining a second set of data tracks on the surface of the magnetic disk using the write head, wherein the write head is positioned during the writing of the second set of data tracks according to positioning signals generated by the read head and the track pitch adjustment.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
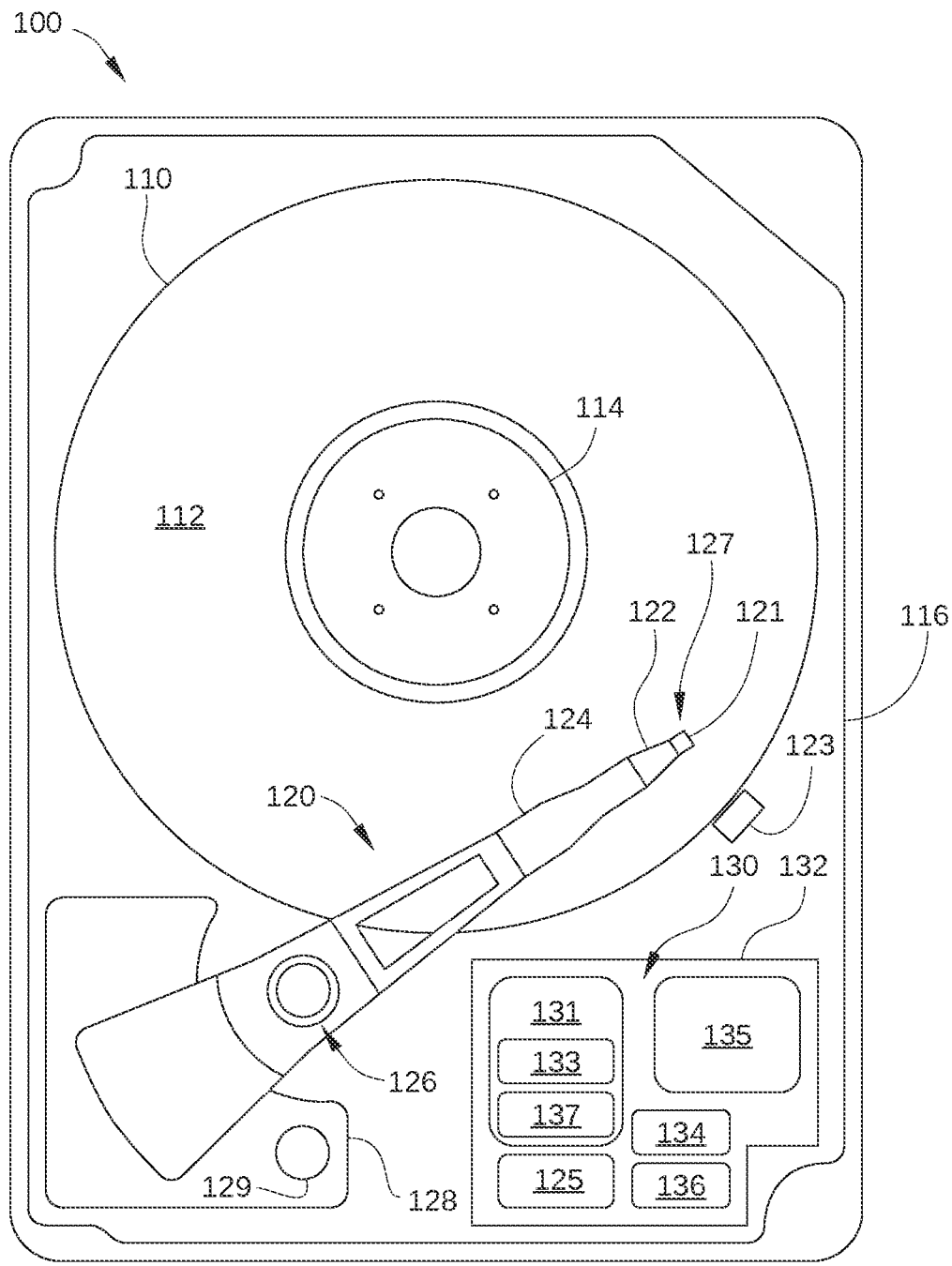
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on base plate 116 or actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk 110 and is configured to unload read/write head 127 from storage disk 110. Typically, at the beginning of a self servo writing (SSW) process, actuator arm assembly 120 is pushed against ID crash stop 129, so that ID crash stop 129 may serve as a position reference at the start of the SSW process.

For clarity, HDD 100 is illustrated with a single storage disk 110 and a single actuator arm assembly 120. HDD 100 typically includes multiple storage disks and multiple actuator arm assemblies. In addition, each side of storage disk 110 typically has a corresponding read/write head associated therewith and coupled to a flexure arm.

When data are transferred to or from storage disk 110, actuator arm assembly 120 sweeps an arc between the ID and the OD of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform SSW is typically in the form of reference spiral tracks or "servo spirals" written on storage disk 110. One embodiment of such servo spirals is illustrated in FIG. 2.

Figure 2:
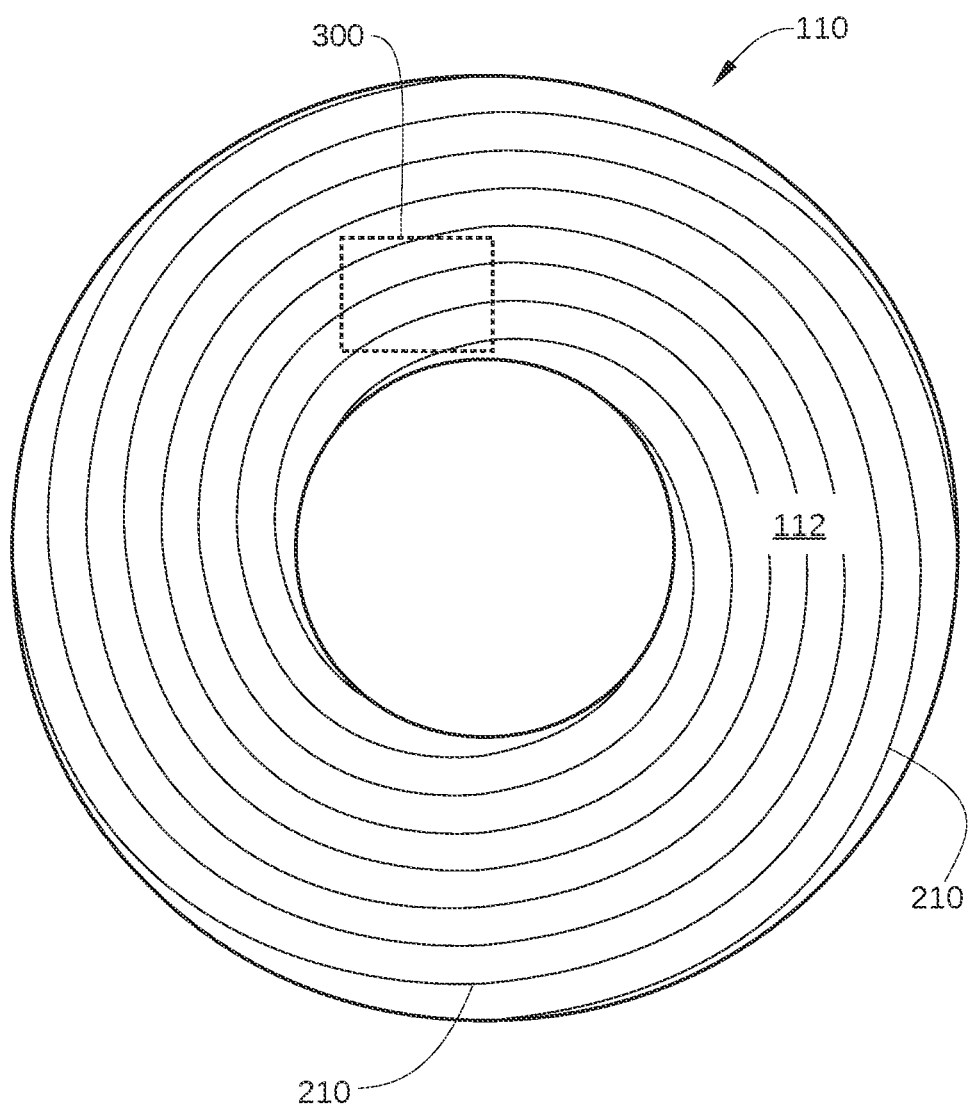
FIG. 2 illustrates a storage disk of the hard disk drive of FIG. 1 prior to undergoing a servo self-write process, according to one embodiment.

FIG. 2 illustrates storage disk 110 prior to undergoing a SSW process, according to one embodiment. As shown, storage disk 110 has a plurality of reference spirals 210 written thereon that are circumferentially spaced from adjacent reference spirals 210. Reference spirals 210 may be written onto a substantially blank surface 112 of storage disk 110 using read/write head 127 and the servo system of HDD 100 with a bootstrap spiral-writing process, with an external media writer before assembly of HDD 100, or with a servo writing machine that uses an external precision actuator to position the disk drive actuator. Reference spirals 210 enable the generation of servo wedges on storage disk 110 using closed-loop control in the servo system of HDD 100. That is, servo wedges can be written while the servo system of HDD 100 uses closed-loop tracking of the reference spirals 210. It is noted that the number of reference spirals 210 written on storage disk 110 is generally larger than that shown in FIG. 2, for example as few as ten or twenty, or as many as several hundred.

During the SSW process, the servo system of HDD 100 uses the timing and position information provided by the above-described reference spirals 210 to servo precisely over a radial position on storage disk 110 that corresponds to a particular concentric data storage track. Thus, while the read head of read/write head 127 is used to read position and timing information from reference spirals 210, the write head of read/write head 127 is used to write servo wedges for a particular radial position on storage disk 110, i.e., for a particular data storage track of storage disk 110. It is noted that data track pitch, which is the radial spacing between each data track of storage disk 110, is strongly affected by the slope of reference spirals 210. One embodiment of reference spiral slope is illustrated in FIG. 3.

Figure 3:
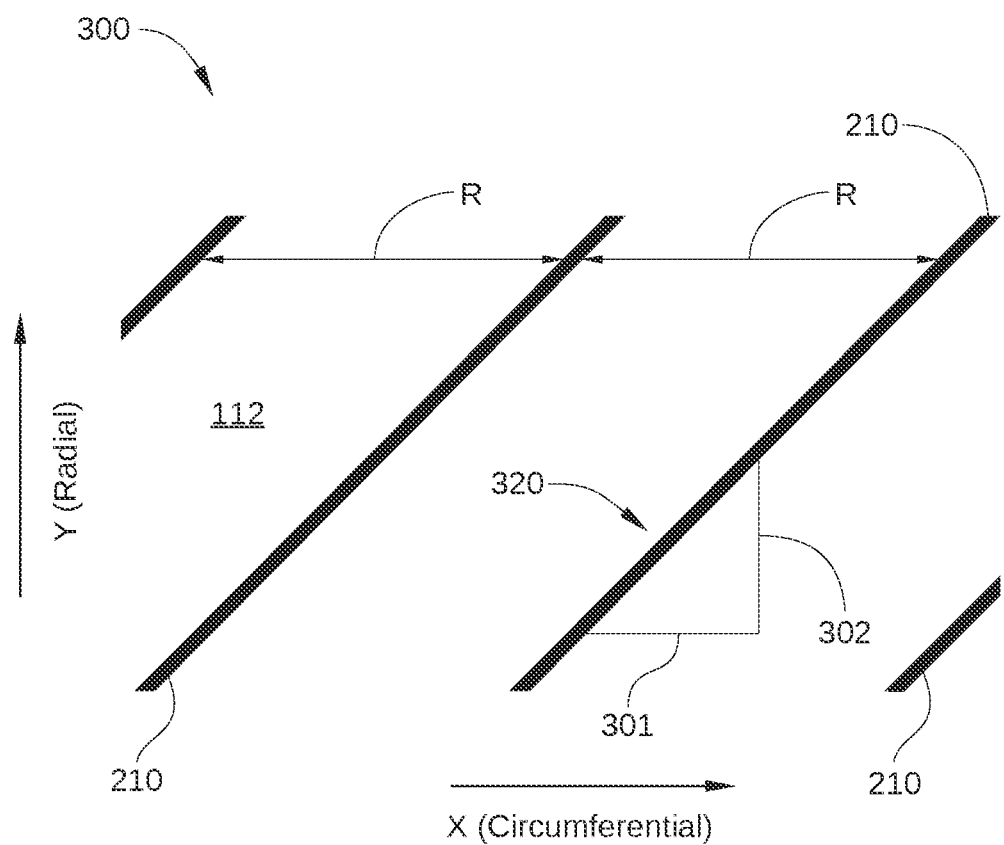
FIG. 3 is a schematic illustration of a portion of a storage disk indicated in FIG. 2 prior to undergoing a servo self-write process, according to one embodiment.

FIG. 3 is a schematic illustration of a portion 300 of storage disk 110 indicated in FIG. 2 prior to undergoing a SSW process. As shown, a plurality of reference spirals 210 are formed on storage disk 110. Displacement along the x-axis in FIG. 3 is illustrated in terms of angular displacement, such as radians or degrees. Assuming that read/write head 127 has written each of reference spirals 210 on storage disk 110 using the same radial velocity profile, reference spirals 210 may be assumed to be circumferentially separated from each other by a substantially uniform angular separation R at any particular radial location on storage disk 110. Thus, reference spirals 210 can be depicted as parallel lines in FIG. 3. Assuming a constant rotational velocity for storage disk 110, when read/write head 127 is positioned at any particular radial location, a time required for read/write head 127 to travel from one to another of reference spirals 210 is substantially a constant time interval.

Reference spiral slope, hereinafter referred to as a "spiral pitch" 320, may be associated with a specific location on or a portion of a reference spiral 210. In some embodiments, spiral pitch 320 may be defined as the ratio of a circumferential angular displacement 301 to a radial linear displacement 302 of the reference spiral 210 at the specific portion or location. In other embodiments, spiral pitch 320 at the specific location or portion may be defined as the ratio of radial linear displacement 302 to circumferential angular displacement 301. Furthermore, any other applicable definition of "slope, "pitch," or "gradient" may be used to quantify spiral pitch 320 at a specific location on or portion of a reference spiral 210. It is noted that the geometrical meaning of spiral "pitch" is very different from the geometrical meaning of data track pitch. Specifically, data track pitch is a separation in the radial direction (between the centerline of adjacent data track pitches), whereas spiral pitch is a slope (of a reference spiral at a particular point on the reference spiral).

As noted, for a particular data track written on storage disk 110 via a SSW process, data track pitch is strongly affected by the value of spiral pitch 320 at the radial location corresponding to the particular data track. Consequently, when reference spirals 210 include portions with a non-ideal spiral pitch 320, data track servo sectors may be written on storage disk 110 with unwanted variation in data track pitch, which is highly undesirable. A comparison of actual spiral pitch vs. ideal spiral pitch is illustrated in FIG. 4.

Figure 4:
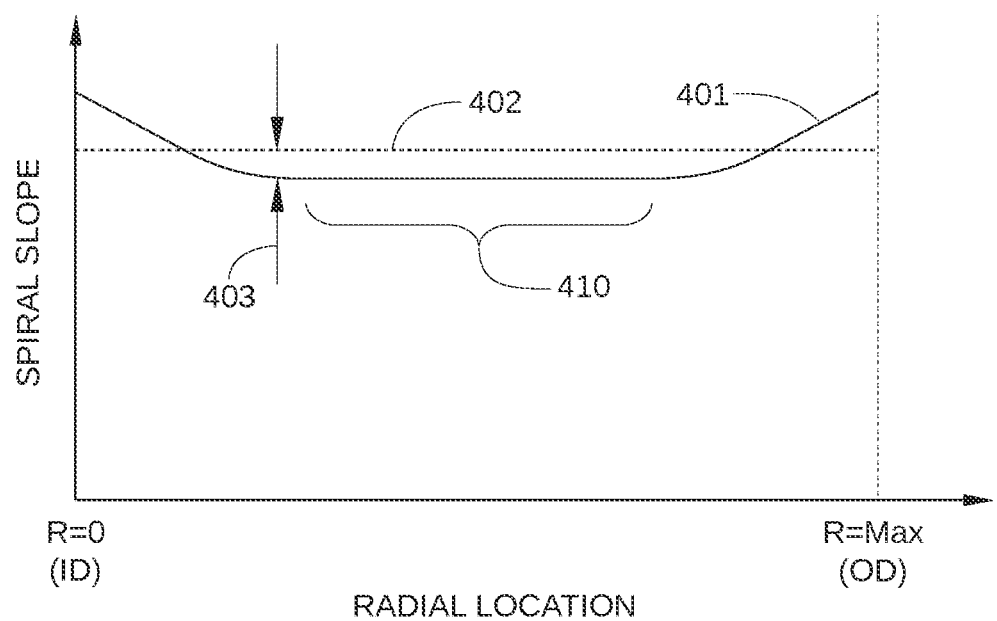
FIG. 4 is a graph illustrating how actual spiral pitch of one or more reference spirals formed on a particular surface of a storage disk may vary as a function of radial position, according to an embodiment.

FIG. 4 is a graph illustrating how actual spiral pitch of one or more reference spirals 210 formed on a particular surface 112 of storage disk 110 may vary as a function of radial position, according to an embodiment. As shown, actual spiral pitch profile 401 may be relatively constant in a region 410 corresponding to the middle diameter (MD) of storage disk 110, but generally increases near the OD and ID of storage disk 110. Reference spirals 210 that are written on storage disk 110 using a bootstrap spiral-writing process are generally more likely to have an actual spiral pitch profile 401, since the velocity feedback for such a spiral-writing process is back electromotive force (EMF). Using back EMF for velocity feedback can cause actual spiral pitch profile 401 to vary from ideal spiral pitch profile 402 since back EMF generally varies with each drive, and is also more susceptible to inaccuracies near the ID and OD of storage disk 110. Thus, the actual spiral pitch of reference spirals 210 may be different in a first radial region (near the ID), a second radial region (near the MD), and a third radial region (near the OD) of storage disk 110.

By contrast, an ideal spiral pitch profile 402 maintains, in the embodiment illustrated in FIG. 4, a substantially constant value across all radial locations. In other embodiments, ideal spiral pitch profile 402 may include portions that are not a constant spiral pitch value, and may instead be a known function of radial position. In either case, for some or most radial locations on storage disk 110, ideal spiral pitch profile 402 has a different value than actual spiral pitch profile 401. At some radial locations, this difference may not be significant. In other radial locations, however, the difference 403 in spiral pitch value between actual spiral pitch profile 401 and ideal spiral pitch profile 402 can result in non-uniform data track pitch when an SSW process is performed using reference spirals 210 with actual spiral pitch profile 401.

According to some embodiments, difference 403 from ideal spiral pitch profile 402 can be compensated for as servo sectors are written across the disk surface during a self-servo write process. Specifically, micro-jog, which is the radial location offset between a reader element and a writer element of a magnetic head, is measured for recently written data tracks. The measured micro jog value is compared to a known nominal micro-jog value for the current radial position of the magnetic head. When the measured micro-jog value does not match the nominal micro-jog value, an appropriate correction to the self-servo write step size is applied to the data track pitch of the next radial position at which servo sectors are written, so that data track pitch remains substantially uniform. Thus, during an SSW process, the nominal micro jog at the current radial position is used to confirm that data track pitch for the most recently written data tracks has not varied from the targeted data track pitch for storage disk 110. In this way, the effect of non-ideal spiral pitch on data track pitch is reduced or eliminated.

Figure 5A:
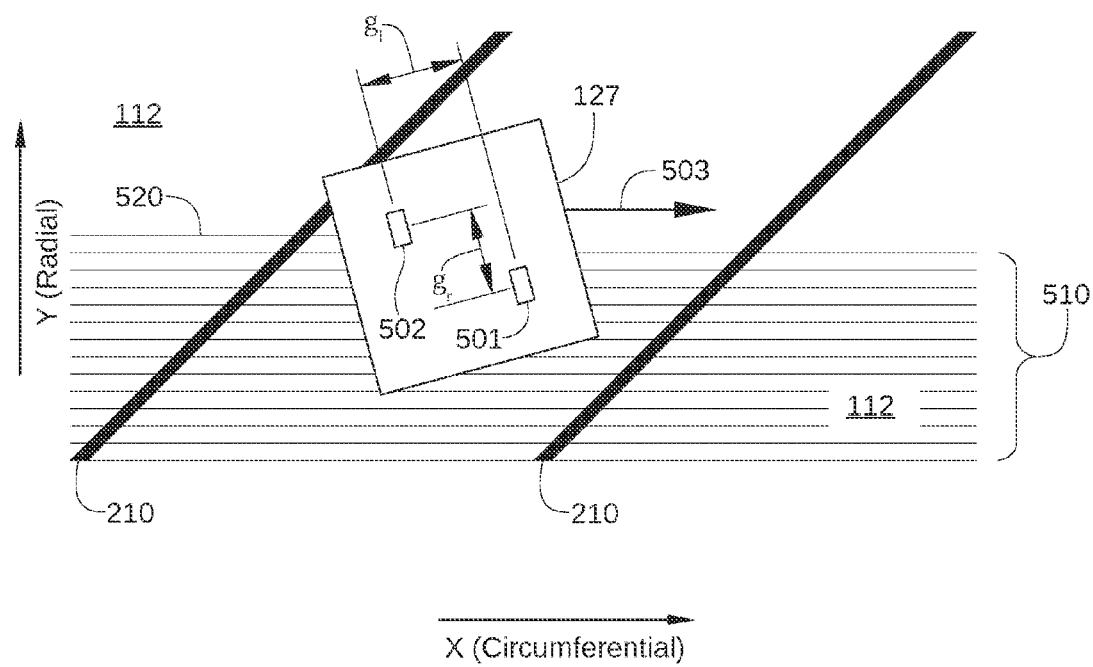
FIGS. 5A and 5B schematically illustrate a read/write head of the hard disk drive of FIG. 1 moving across a surface of storage disk 110 during an SSW process, according to an embodiment.
Figure 5B:
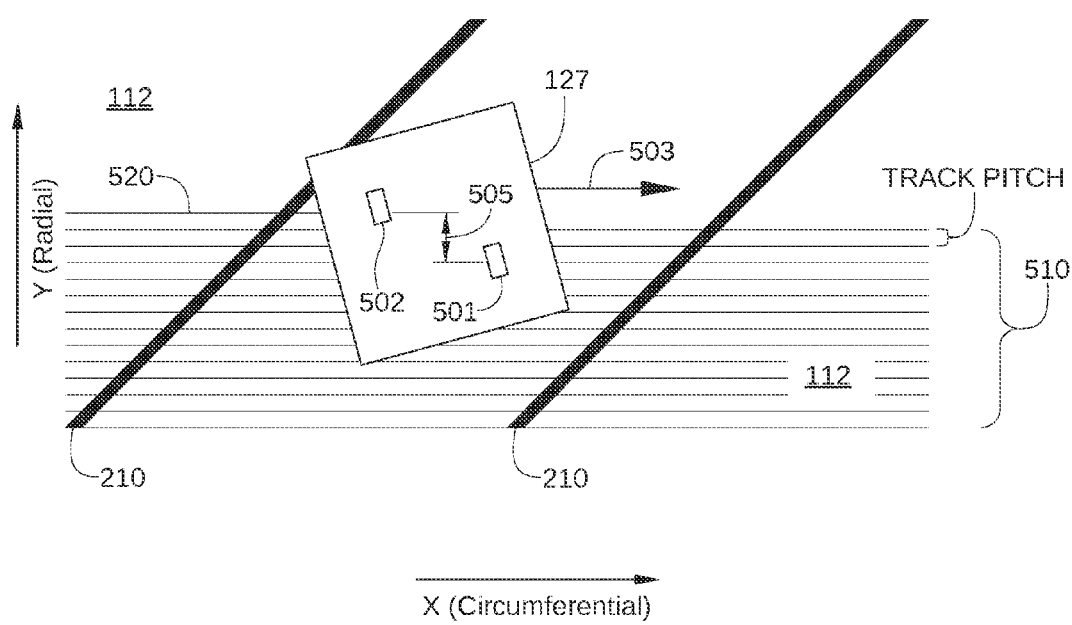

FIGS. 5A and 5B schematically illustrate read/write head 127 moving across surface 112 of storage disk 110 during an SSW process, according to an embodiment. Read/write head 127 includes a read element 501 and a write element 502 that is disposed on read/write head 127 with a radial offset, or radial gap, $g_r$, and a longitudinal offset, or longitudinal gap, $g_l$ from read element 501. Also shown are reference spirals 210, the centerlines 510 of previously defined data tracks, and the centerline 520 of a data track that is being defined on surface 112 as servo sectors (not shown) are written on surface 112 as part of the SSW process. Centerlines 510 and 520 are defined by servo sectors written on surface 112 by write element 502 earlier in the SSW process, but for clarity these servo sectors are omitted from FIG. 5.

Arrow 503 indicates the direction of circumferential motion of read/write head 127 relative to surface 112. Due to the curved stroke of actuator arm assembly 120 (shown in FIG. 1), read/write head 127 varies in angular orientation with respect to centerlines 510 and 520 based on the current radial location read/write head 127, and generally is not oriented orthogonally to centerlines 510 and 520. Consequently, a micro jog 505 (shown in FIG. 5B), which is the offset in the radial direction between a read element 501 and a write element 502, varies as a function of the radial location of read/write head 127. Thus, at most radial locations of read/write head 127, micro jog 505 is different than radial gap $g_r$.

Figure 6:
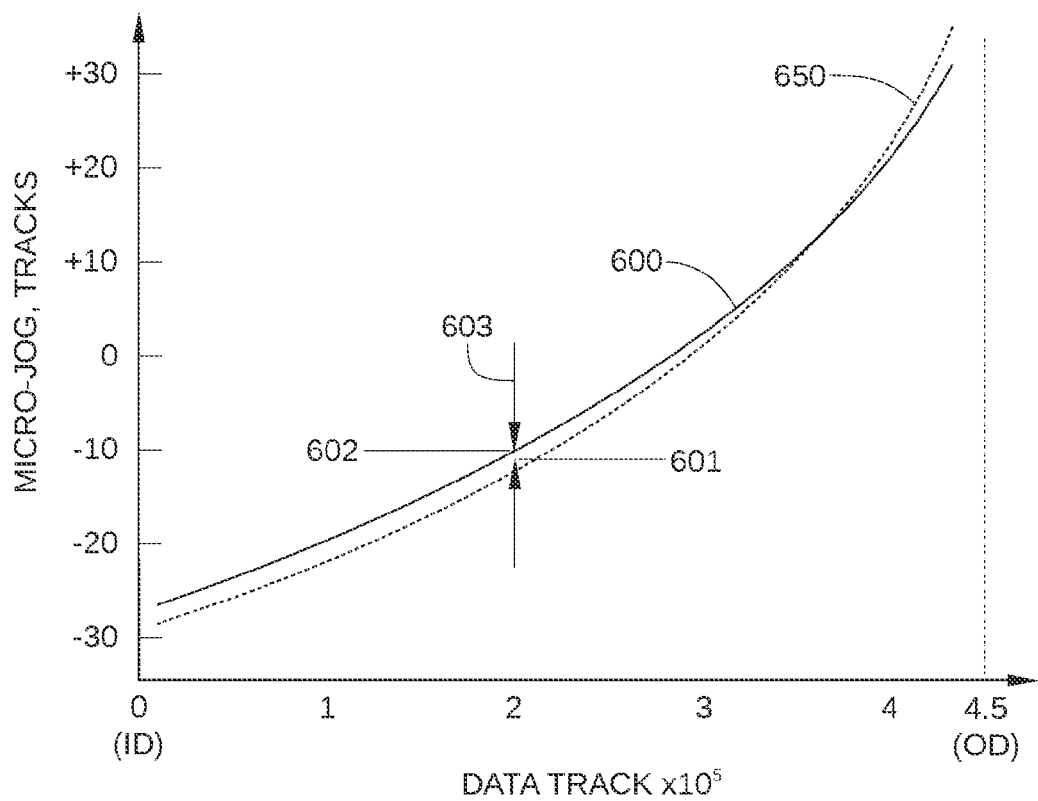
FIG. 6 is a graph illustrating a nominal micro-jog variation function across the stroke of a particular instance of the hard disk drive of FIG. 1.

According to some embodiments, a nominal value for micro-jog 505 may be characterized for each radial location across surface 112, for example as a function of radial location. In some embodiments, such a function indicating variation of the nominal value for micro-jog 505 with respect to radial location across the surface of storage disk 110 may be determined by drive and head geometry for a particular model of HDD 100, as described below in conjunction with FIG. 8. In such embodiments, a calibration process for a particular instance of this model of HDD 100 may be employed to modify the above-described function, and an example of such a calibration process is described below in conjunction with FIG. 9. Alternatively, the function indicating variation of the nominal value for micro-jog 505 with respect to radial location across the surface of storage disk 110 may be determined empirically for a particular model of HDD 100, then modified with a calibration process for a particular instance of that model. FIG. 6 illustrates one example of such a function that indicates variation of the nominal value for micro jog 505 with respect to radial location.

FIG. 6 is a graph illustrating a nominal micro jog variation function 600 across the stroke of a particular instance of HDD 100. Nominal micro jog variation function 600 indicates a nominal, or ideal, value for micro jog 505 for each radial location across surface 112 of storage disk 110. For reference, also shown in FIG. 6 is an actual micro-jog function 650 illustrating the actual values of micro-jog 505 for a particular instance of HDD 100, if actual micro jog were measured at each radial location after completion of a conventional SSW process.

In the embodiment illustrated in FIG. 6, nominal micro-jog varies from approximately −30 tracks near the OD of storage disk 110 to approximately +30 tracks near the ID of storage disk 110, where the micro-jog value is expressed in terms of tracks having ideal, uniform track pitch. In other embodiments, the micro-jog varies between the OD of storage disk 110 to the ID of storage disk 110, but remains positive or negative across the entire stroke of actuator arm assembly 120. If the actual (i.e., measured) value of micro-jog 505 is determined to be significantly different than the nominal value of micro jog 505 for recently written servo sectors, then the data track pitch for the recently written servo sectors can be assumed to be incorrect, i.e., too wide or too narrow. Thus, the radial step distance for subsequently written data tracks can be modified so that substantially ideal data track pitch (shown in FIG. 5B) is maintained during the SSW process.

For example, after the servo sectors for track 200,000 are written on storage disk 110, an actual micro jog value 601 may be measured at the radial location corresponding to track 200,000. As shown, actual micro jog value 601 is significantly different than a nominal micro jog value 602 indicated for track 200,000, for example by a difference 603. Therefore, the SSW write step distance between track 200,000 and track 200,001 is modified accordingly, so that the difference between actual micro-jog value 601 and nominal micro-jog value 602 for track 200,001 (and subsequently written tracks) is reduced or eliminated. Any suitable algorithm may be employed to determine by what value the SSW write step distance should be modified, and anyone of ordinary skill in the art, upon reading the disclosure herein, could determine such an algorithm.

In FIG. 6, the value of difference 603 is depicted to be multiple tracks. In practice, the SSW write step distance between a track that has just been written and the next track to be written may be modified in response to a much smaller value of difference 603. For example, difference 603 may be as small as a fraction of a track, such as 1%, 10%, etc. Thus, the above-described corrections can be made with sufficient frequency that deviation between the actual data track pitch and the ideal data track pitch can be relatively small before being corrected, making data track pitch substantially equal to the ideal data track pitch for storage disk 110 across surface 112. In this way, track pitch at all radial locations of storage disk 110 may be uniform despite inaccuracies introduced by servo spirals with non-ideal spiral pitch.

Figure 7:
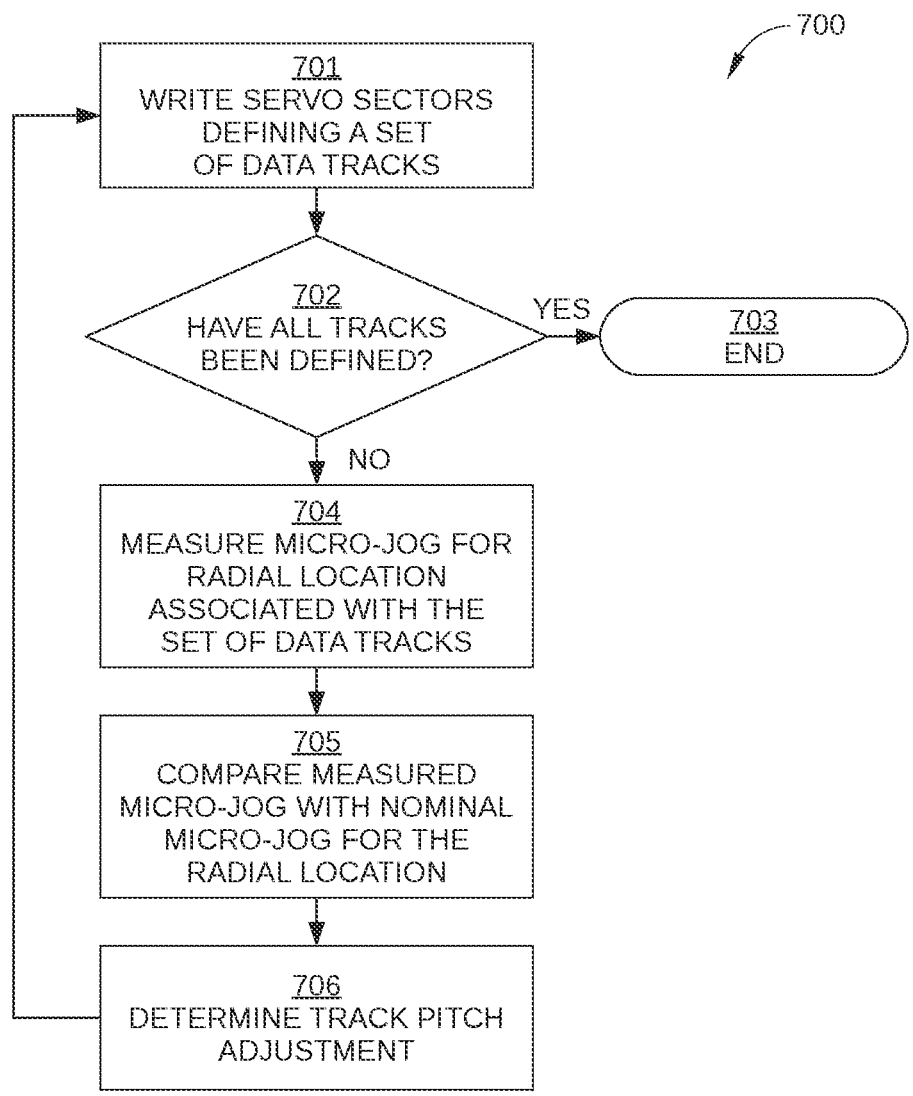
FIG. 7 sets forth a flowchart of method steps for in-drive writing of servo sectors that have uniform radial spacing on a disk surface, according to an embodiment.

FIG. 7 sets forth a flowchart of method steps for in-drive writing of servo sectors that have uniform radial spacing on a disk surface, according to an embodiment. Although the method steps are described in conjunction with HDD 100 in FIGS. 1-6, persons skilled in the art will understand that the method steps may be performed with other hard disk drives. The control algorithms for the method steps according to the embodiment may reside in microprocessor-based controller 133, or alternatively, in some other embodiments, an external host device. For clarity, controller 133 is described performing said control algorithms for the method steps, although other external control devices can potentially be used in such a role.

As shown, a method 700 begins at step 701, where microprocessor-based controller 133 or other suitable control circuit or system causes to be written, as part of an SSW process, servo sectors defining a set of data tracks on a surface 112 of storage disk 110. For example, 100, 1,000, 10,000, or more tracks may be included in the set of data tracks. It is noted that the servo sectors defining the set of data tracks may be positioned based on a previously determined track pitch adjustment, described below in step 706. In step 702, microprocessor-based controller 133 determines whether all data tracks for surface 112 have been defined. If yes, method 700 proceeds to step 703 and ends; if no, method 700 proceeds 700 proceeds to step 704.

In step 704, microprocessor-based controller 133 causes the value of micro-jog 505 to be measured for a radial location associated with the set of data tracks written in step 701. For example, in some embodiments, microprocessor-based controller 133 causes the value of micro jog 505 to be measured for one of the data tracks included in the set of data tracks written in step 701. In some embodiments, the actual value for micro-jog 505 is measured by positioning the read head over the most recently defined data track in the set of data tracks written in step 701. Generally, measurement of micro jog 505 is performed via read/write head 127 using procedures typically included in the capabilities of HDD 100.

In step 705, microprocessor-based controller 133 compares the actual value for micro-jog 505 measured in step 704 with an expected value for micro jog 505, i.e., a nominal value for micro-jog 505 associated with the radial location corresponding to the micro jog measurement in step 704. For example, the nominal value may be determined from nominal micro jog variation function 600 or from a table of nominal values for micro-jog 505 vs. radial location. In step 706, microprocessor-based controller 133 determines a track pitch adjustment based on the difference between the actual value for micro jog 505 measured in step 704 and the nominal value for micro-jog 505 determined in step 705. Method 700 then proceeds back to step 701.

Generally, the track pitch adjustment is selected to reduce data track pitch of subsequently written data tracks when the absolute value of the actual micro jog is less than the absolute value of the nominal micro-jog value. The absolute value of the actual micro-jog is less than the absolute value of the nominal micro jog value when the actual data track pitch of the most recently written data tracks is greater than the ideal data track pitch for HDD 100. Thus, when data track pitch is determined to be greater than the ideal data track pitch, data track pitch of subsequently written data tracks is reduced. Conversely, the track pitch adjustment is selected to increase data track pitch of subsequently written data tracks when the absolute value of the actual micro-jog is greater than the absolute value of the nominal micro jog value. The absolute value of the actual micro jog is greater than the absolute value of the nominal micro jog value when the actual data track pitch of the most recently written data tracks is less than the ideal data track pitch for HDD 100. Thus, when data track pitch is determined to be less than the ideal data track pitch, data track pitch of subsequently written data tracks is increased.

In some embodiments, nominal micro jog variation function 600 employed in method 700 may be determined based on drive and head geometry for a particular model of HDD 100. Generation of one such embodiment of nominal micro-jog variation function 600 is described below in conjunction with FIG. 8.

Figure 8:
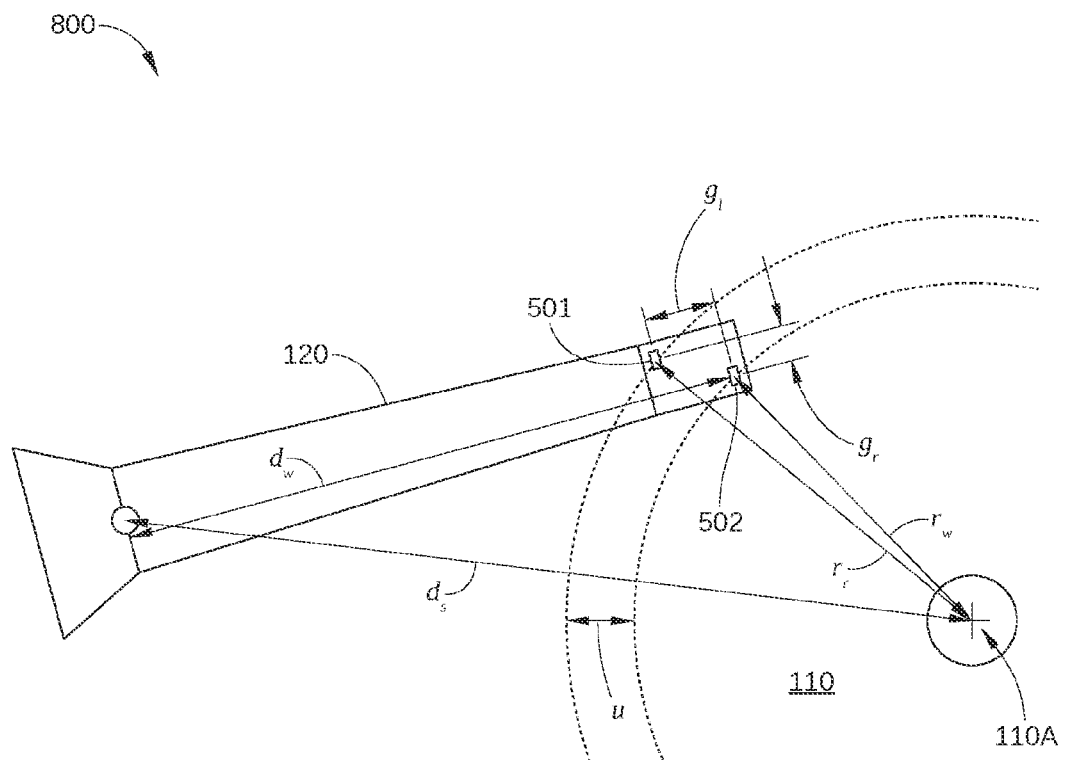
FIG. 8 schematically illustrates a geometrical layout of an actuator arm assembly and storage disk of the hard disk drive of FIG. 1 for the determination of nominal micro jog variation function, according to an embodiment.

FIG. 8 schematically illustrates a geometrical layout 800 of actuator arm assembly 120 and storage disk 110 for the determination of nominal micro-jog variation function 600, according to an embodiment. The variation of micro-jog u across the stroke of actuator arm assembly 120 typically follows a well-defined curve with respect to the radial position of read/write head 127, and may be determined by drive and head geometry. Therefore, micro-jog u can be computed from, and is a function of, dimensions $d_s$, $d_w$, $g_r$, $g_l$, and $r_w$. Thus, $u=f(d_s, d_w, g_r, g_l, r_w)$, where $f$ is a nonlinear function that can be derived from by well-known trigonometric techniques. As shown in FIG. 8, $d_s$=the distance between the pivot point of arm actuator arm assembly 120 and the disk center 110A of storage disk 110; $d_w$=the distance between the pivot point of arm actuator arm assembly 120 and the write element 502; $g_r$=the radial offset between read element 501 and write element 502; $g_l$=the longitudinal offset between read element 501 and write element 502; $r_w$=the distance between disk center 110A and a center point of write element 502, i.e., the radial location of write element 502; and $r_r$=the distance between disk center 110A and a center point of read element 501, i.e., the radial location of write element 501.

In a typical disk drive, $d_s$ and $d_w$ are accurately controlled by the manufacturing process, and dimension $r_w$ is accurately controlled by the servo system of HDD 100. By contrast, $g_r$ and $g_l$ may vary significantly for each manufactured instance of read/write head 127 due to manufacturing process inaccuracies, so these dimensions are not exactly known and require calibration. It is noted that $g_r$ and $g_l$ are two independent variables in the function $u=f(d_s, d_w, g_r, g_l, r_w)$. Thus, the values for $g_r$ and $g_l$ for a particular manufactured instance of read/write head 127 can be determined by solving a system of two equations in which the values of micro-jog u and the variables $d_s$, $d_w$, $l$, and $r_w$ are all known. Specifically, by writing short bands of servo sectors that define data tracks at two different radial locations ($r_{w1}$ and $r_{w2}$), micro jog u at those locations, i.e., micro-jog $u_1$ and $u_2$, can be measured by HDD 100. Substituting the known values micro-jog $u_1$ and $r_{w1}$ into the function $u=f(d_s, d_w, g_r, g_l, r_w)$ yields Equation 1 and substituting the known values micro-jog $u_2$ and $r_{w2}$ into the function $u=f(d_s, d_w, g_r, g_l, r_w)$ yields Equation 2:

$$u_1=f(d_s, d_w, g_r, g_l, r_{w1}) \tag{1}$$

$$u_2=f(d_s, d_w, g_r, g_l, r_{w2}) \tag{2}$$

Equations 1 and 2 can be solved simultaneously to determine the values for $g_r$ and $g_l$ for the particular manufactured instance of read/write head 127 being calibrated. Once the values for $g_r$ and $g_l$ for the particular manufactured instance of read/write head 127 have been determined, nominal micro jog variation function 600 in FIG. 6 can be calculated, and a nominal value of micro jog u can be determined for any radial location of storage disk 110 for that particular read/write head 127 of HDD 110.

In some embodiments, the accuracy of the values for $g_r$ and $g_l$ determined in this way may be increased by selecting values of $r_{w1}$ and $r_{w2}$ that correspond to a portion of the stroke of actuator arm assembly 120 in which there is relatively little data track pitch variation, such as in region 410 (shown in FIG. 4) corresponding to the MD of storage disk 110. Because the majority of variation in micro jog u in this region can be assumed to be due to $g_r$ and $g_l$, inaccuracies in the values of $g_r$ and $g_l$ are reduced or minimized when the radial locations $r_{w1}$ and $r_{w2}$ are selected to be in such a region. Thus, in such embodiments, the values of radial locations $r_{w1}$ and $r_{w2}$ are not proximate the ID or OD of storage disk 110. For example, radial location $r_{w1}$ may be disposed approximately equidistant from the ID and the MD (near the ⅓ stroke position), and location $r_{w2}$ may be disposed approximately equidistant from the MD and the OD (near the ⅔ stroke position).

Figure 9:
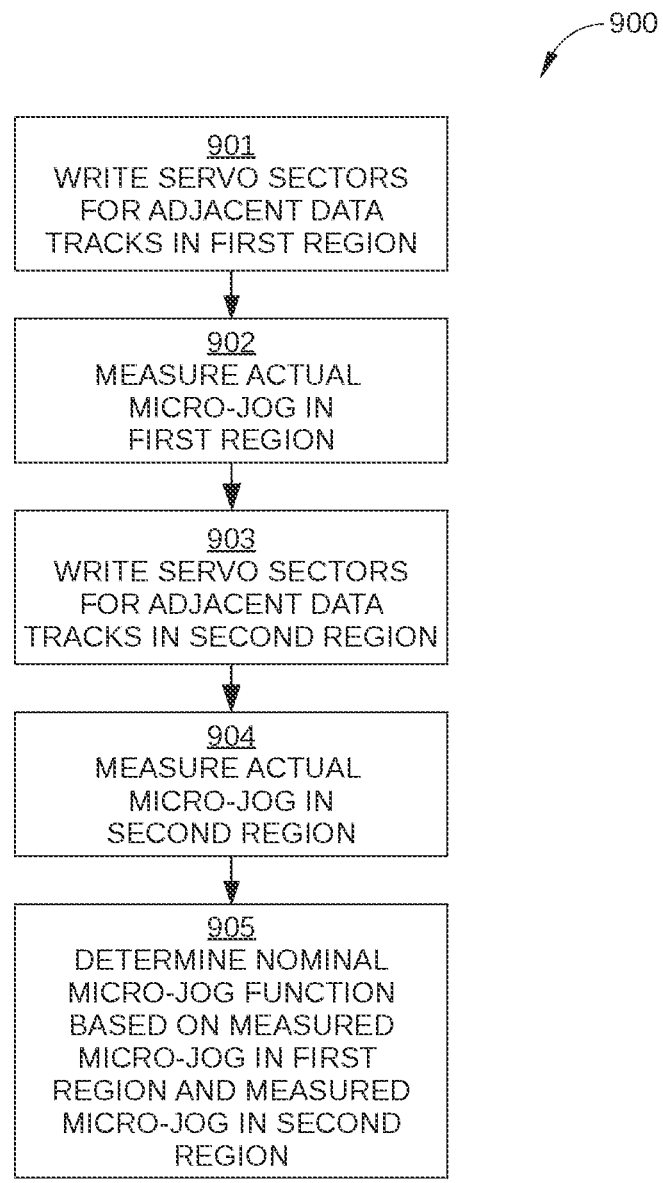
FIG. 9 sets forth a flowchart of method steps for determining a nominal micro jog function in a data storage device, according to an embodiment.

FIG. 9 sets forth a flowchart of method steps for determining a nominal micro jog function in a data storage device, according to an embodiment. Although the method steps are described in conjunction with HDD 100 of FIGS. 1-8, persons skilled in the art will understand that the method steps 900 may be performed with other hard disk drives. The control algorithms for the method steps may reside in and/or be performed by microprocessor-based controller 133 and/or any other suitable control circuit or system, including an external host.

As shown, a method 900 begins at step 901, where microprocessor-based controller 133 or other suitable control circuit or system causes servo sectors for multiple adjacent data tracks to be written in a first region of storage disk 100. Typically, the multiple adjacent data tracks are written with read/write head 127, which is positioned based on timing and location information provided by reference spirals 210. In some embodiments, servo sectors for a sufficient number of data tracks are written in the first region to at least span in the radial direction the typical radial offset, or micro-jog, of read/write head 127 when located at a radial location that corresponds to the first region. Thus, when the micro-jog for read/write head 127 is on the order of 10 or 12 data tracks, servo sectors are written for 12 or more data tracks in step 901.

In some embodiments, the first region is disposed in a portion of the stroke of actuator arm assembly 120 in which there is relatively little data track pitch variation from track to track, such as a region that corresponds to the MD of storage disk 110. In some embodiments, the first region is disposed at approximately the ⅓ stroke position for actuator arm assembly 120.

In step 902, microprocessor-based controller 133 causes a first micro-jog value to be measured in the first region, where the unit of measure for the micro-jog value is written data tracks. Measurement of micro jog in terms of previously written data tracks is well-known in the art, and any technically feasible procedure for such measurement may be employed in step 902. For example, in some embodiments, read/write head 127 continues to be positioned over a fixed radial location using reference spirals 210, but the servo sectors written in step 901 are also read. The position information collected when reading the servo sectors at the fixed radial location indicates the current data track location of the read element of read/write head 127. In addition, the position information collected when reading the timing and position information provided by reference spirals 210 can be used to calculate the track position of the write element of read/write head 127, since reference spirals 210 were used to position the write element when the servo sectors written in the first region. Thus, micro jog associated with the first region can be computed, since the track position of the read element and the track position of the write element are known, and micro-jog is the radial distance (or number of written tracks) between the radial location of the read element and the radial location of the write element.

In step 903, microprocessor-based controller 133 causes servo sectors for multiple adjacent data tracks to be written in a second region of storage disk 100. Typically, the multiple adjacent data tracks are written with read/write head 127, which is positioned based on timing and location information provided by reference spirals 210. Similar to step 901, in some embodiments, servo sectors for a sufficient number of data tracks are written in the second region to at least span the micro-jog of read/write head 127 when located at a radial location that corresponds to the second region. In some embodiments, the second region is disposed in a portion of the stroke of actuator arm assembly 120 in which there is relatively little data track pitch variation from track to track, such as a region that corresponds to the MD of storage disk 110. In some embodiments, the second region is disposed at approximately the ⅔ stroke position for actuator arm assembly 120.

In step 904, microprocessor-based controller 133 causes a second micro jog value to be measured in the second region, for example using the same technique employed for measuring the first micro-jog value in step 902.

In step 905, microprocessor-based controller 133 determines a nominal micro jog function. The nominal micro jog function indicates a nominal, or expected, micro-jog value for each radial position of a specific read/write head 127 of HDD 100, and is determined based on the first micro jog value measured in step 902 and the second micro-jog value measured in step 904. As described above in conjunction with FIG. 8, the nominal micro-jog may be a non-linear function based on the geometric configuration of read/write head 127, actuator arm assembly 120, storage disk 110, and/or other elements of HDD 100. The nominal micro jog function may be stored in firmware and/or in nonvolatile memory associated with HDD 100, and employed in method 700 of FIG. 7.

Figure 10:
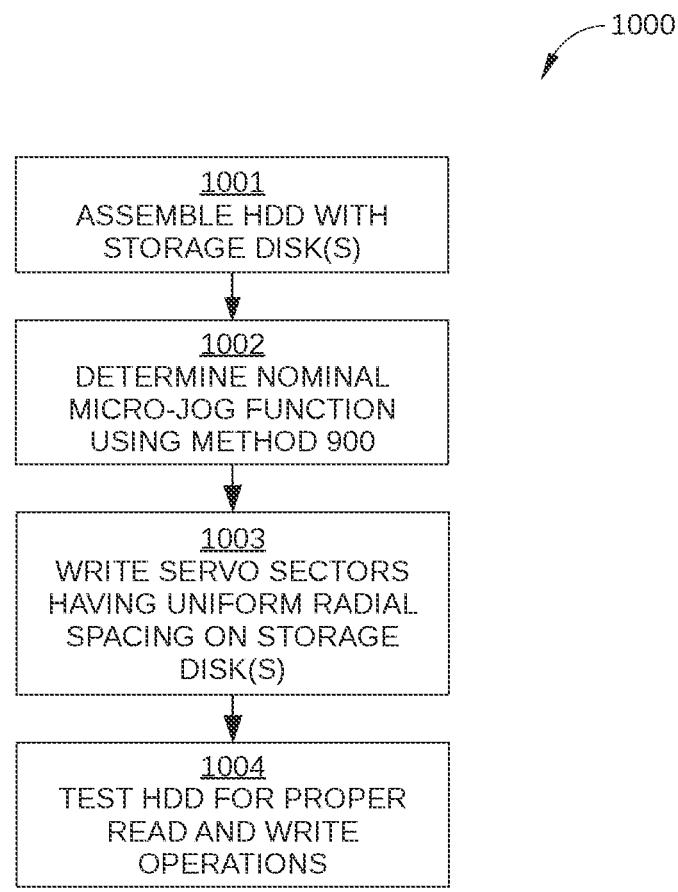
FIG. 10 sets forth a flowchart of method steps for manufacturing the hard disk drive of FIG. 1, according to an embodiment.

FIG. 10 sets forth a flowchart of method steps for manufacturing HDD 100, according to an embodiment. Although the method steps are described in conjunction with HDD 100 in FIGS. 1-9, persons skilled in the art will understand that the method steps may also be performed for manufacturing other types of hard disk drives.

As shown, a method 1000 begins at step 1001, where HDD 100 is assembled, including the incorporation of multiple storage disks 110 in the housing of HDD 100. In step 1002, a nominal micro jog function is determined for HDD 100 using method 900, as set forth above. In step 1003, servo sectors that have uniform radial spacing are written on surfaces of the multiple storage disk 110 that were incorporated in the housing of HDD 100 in step 1001. The servo sectors are written using the embodiment of method 700, as set forth above. In step 1004, HDD 100 is tested for proper writing and reading operations.

In sum, embodiments herein provide systems and methods for in-drive writing of servo sectors that have uniform radial spacing on a disk surface. During a self-servo write process a radial offset between a reader element and a writer element of a magnetic head is measured. The measured radial offset, or micro-jog, is compared to a known nominal micro jog value for the current radial position of the magnetic head. When the measured micro jog value does not match the nominal micro jog value, an appropriate correction to the self-servo write step size is applied to the radial spacing between the servo sectors being written. Thus, the variations from ideal servo spiral slope that are inherent in some servo spirals can be compensated for, thereby improving the uniformity of radial spacing of data tracks associated with the servo sectors.

While the foregoing is directed to embodiments of the present invention, other and further embodiments of the invention may be devised without departing from the basic scope thereof, and the scope thereof is determined by the claims that follow.

We claim:

1. A method of writing servo information on a surface of a magnetic disk with a magnetic head having a read head and a write head that is offset from the read head by a fixed distance, the method comprising:
    writing servo sectors defining a first set of data tracks on the surface of the magnetic disk using the write head, wherein the write head is positioned during the writing of the first set of data tracks according to positioning signals generated by the read head;
    measuring a radial offset between the write head and the read head when the magnetic head is positioned over the first set of data tracks;
    determining a track pitch adjustment based on a difference between the measured radial offset and an expected radial offset when the magnetic head is positioned over the first set of data tracks; and
    writing servo sectors defining a second set of data tracks on the surface of the magnetic disk using the write head, wherein the write head is positioned during the writing of the second set of data tracks according to positioning signals generated by the read head and the track pitch adjustment,
    wherein the track pitch adjustment is selected to reduce track pitch when an absolute value of the measured radial offset is less than an absolute value of the expected radial offset, and the track pitch adjustment is selected to increase track pitch when the absolute value of the measured radial offset is greater than the absolute value of the expected radial offset.

2. The method of claim 1, wherein the radial offset between the write head and the read head is measured by determining a current radial track position of the read head within the first set of data tracks by moving the read head to a position above one of the data tracks in the first set that was written while the write head was positioned at the current radial track position.

3. The method of claim 2, wherein said writing servo sectors defining a first set of data tracks comprises servoing the read head off reference spirals written on the magnetic disk to position the write head above one of the data tracks in the first set.

4. The method of claim 1, wherein the magnetic disk has a first radial region, a second radial region, and a third radial region between the first and second radial regions, and the track pitch adjustment is a positive value when the first and second sets of data tracks are in the first radial region, and a negative value when the first and second sets of data tracks are in the second radial region.

5. The method of claim 1, wherein the expected radial offset is a function of a read or write head's radial position on the magnetic disk, and varies non-linearly with respect to the read or write head's radial position on the magnetic disk.

6. The method of claim 1, wherein the expected radial offset is determined based on a nominal micro-jog function for the magnetic head.

7. The method of claim 6, further comprising, prior to writing servo sectors defining a first set of data tracks:
  writing servo sectors defining multiple adjacent data tracks in a first region of the surface;
  measuring a first radial offset between the read head and the write head when the magnetic head is positioned over the multiple adjacent data tracks in the first region;
  writing servo sectors defining multiple adjacent data tracks in a second region of the surface;
  measuring a second radial offset between the read head and the write head when the magnetic head is positioned over the multiple adjacent data tracks in the second region; and
  based on the first radial offset and the second radial offset, computing the nominal micro-jog curve for the magnetic head.

8. The method of claim 7, wherein the first region is disposed between an inner diameter of the magnetic disk and a middle diameter of the magnetic disk, and the second region is disposed between the middle diameter and an outer diameter of the magnetic disk.

9. The method of claim 8, wherein the first region is disposed approximately equidistant from the inner diameter and the middle diameter, and the second region is disposed approximately equidistant from the middle diameter and the outer diameter.

10. The method of claim 7, wherein said writing servo sectors defining multiple adjacent data tracks in the first region comprises positioning the write head by servoing the read head off reference spirals written on the magnetic disk.

11. The method of claim 7, wherein the nominal micro-jog function is a nonlinear function that indicates a nominal micro-jog value for each radial position of the magnetic head.

12. The method of claim 11, wherein the nominal micro-jog function is based on a geometric configuration of the magnetic head.

13. The method of claim 1, wherein the radial offset between the write head and the read head is measured by determining a current radial track position of the read head within the first set of data tracks by moving the read head to a position above one of the data tracks in the first set that was written while the write head was positioned at the current radial track position.

14. The method of claim 13, wherein said writing servo sectors defining a first set of data tracks comprises servoing the read head off reference spirals written on the magnetic disk to position the write head above one of the data tracks in the first set.

15. A data storage device comprising:
  a magnetic disk with a writable surface;
  a magnetic head having a read head and a write head that is offset from the read head by a fixed distance; and
  a controller configured to:
  cause servo sectors defining a first set of data tracks to be written on the surface of the magnetic disk using a write head, wherein the write head is positioned during the writing of the first set of data tracks according to positioning signals generated by the read head;
  calculate a radial offset between the write head and the read head when the magnetic head is positioned over the first set of data tracks;
  determine a track pitch adjustment based on a difference between the measured radial offset and an expected radial offset when the magnetic head is positioned over the first set of data tracks; and
  cause servo sectors defining a second set of data tracks to be written on the surface of the magnetic disk using the write head, wherein the write head is positioned during the writing of the second set of data tracks according to positioning signals generated by the read head and the track pitch adjustment,
  wherein the track pitch adjustment is selected to reduce track pitch when an absolute value of the measured radial offset is less than an absolute value of the expected radial offset, and the track pitch adjustment is selected to increase track pitch when an absolute value of the measured radial offset is greater than an absolute value of the expected radial offset.

16. The data storage device of claim 15, wherein the radial offset between the write head and the read head is measured by determining a current radial track position of the read head within the first set of data tracks by moving the read head to a position above one of the data tracks in the first set that was written while the write head was positioned at the current radial track position.

17. The data storage device of claim 16, wherein the controller is further configured to servo the read head off reference spirals written on the magnetic disk to position the write head above one of the data tracks in the first set.

18. The data storage device of claim 15, wherein the expected radial offset is determined based on a nominal micro-jog function for the magnetic head.

19. A method of manufacturing a hard disk drive with a magnetic head having a read head and a write head that is offset from the read head by a fixed distance, the method comprising:
  incorporating a magnetic disk in a housing of the hard disk drive;
  writing servo sectors defining a first set of data tracks on a surface of the magnetic disk using the write head, wherein the write head is positioned during the writing of the first set of data tracks according to positioning signals generated by the read head;
  measuring a radial offset between the write head and the read head when the magnetic head is positioned over the first set of data tracks;
  determining a track pitch adjustment based on a difference between the measured radial offset and an expected radial offset when the magnetic head is positioned over the first set of data tracks; and
  writing servo sectors defining a second set of data tracks on the surface of the magnetic disk using the write head, wherein the write head is positioned during the writing of the second set of data tracks according to positioning signals generated by the read head and the track pitch adjustment, wherein the track pitch adjustment is selected to reduce track pitch when an absolute value of the measured radial offset is less than an absolute value of the expected radial offset, and the track pitch adjustment is selected to increase track pitch when an absolute value of the measured radial offset is greater than an absolute value of the expected radial offset.

20. The method of claim 19, wherein the expected radial offset is determined based on a nominal micro-jog function for the magnetic head.

* * * * *